United States Patent [19]
Shinoda

[11] Patent Number: 4,718,112
[45] Date of Patent: Jan. 5, 1988

[54] REMOTE CONTROL APPARATUS

[75] Inventor: Hatsuhiko Shinoda, Tokyo, Japan

[73] Assignee: Sony Corporation, Tokyo, Japan

[21] Appl. No.: 782,538

[22] Filed: Oct. 1, 1985

[30] Foreign Application Priority Data

Oct. 5, 1984 [JP] Japan .................. 59-206915

[51] Int. Cl.$^4$ .................................. H04B 1/16
[52] U.S. Cl. ...................... 455/151; 455/171;
455/231; 455/89; 455/603; 358/194.1
[58] Field of Search ............... 455/151, 171, 231, 603,
455/89; 358/194.1; 340/825.22, 825.24, 825.69;
364/145; 371/19

[56] References Cited

U.S. PATENT DOCUMENTS

| | | | |
|---|---|---|---|
| 4,193,120 | 3/1980 | Yello | 364/145 |
| 4,279,012 | 7/1981 | Beckedorff et al. | 340/825.22 |
| 4,418,333 | 11/1983 | Schwarzbach et al. | 340/825.22 |
| 4,566,034 | 1/1986 | Harger et al. | 455/151 |
| 4,593,155 | 6/1986 | Hawkins | 455/89 |

Primary Examiner—Michael A. Masinick
Attorney, Agent, or Firm—Lewis H. Eslinger; Alvin Sinderbrand

[57] ABSTRACT

Apparatus for remotely controlling the operation of various electronic devices comprises a remote-control unit having a read-only memory for storing a data table, a keyboard for generating a program to be executed at a predetermined future time, a random-access memory for storing the program, a central processing unit jointly interactive with the read-only memory and the random-access memory, and a transmitter controlled by the central processing unit for producing a remote-control signal based on the data table and the program. A receiver is responsive to the remote-control signal for controlling the devices in accordance therewith, and a simulator is provided for producing the remote-control signal before the predetermined future time, so that at least a portion of the program is pre-executed as a test of its validity.

6 Claims, 6 Drawing Figures

REMOTE CONTROL APPARATUS

BACKGROUND OF THE INVENTION

1. Field of the Invention

This invention generally relates to remote-control apparatus and, more particularly, to novel and highly-effective apparatus for remotely controlling the operation of one or more electronic devices.

2. Prior Art

Remote-control apparatus is available for turning on and off the power source of various electronic instruments at a desired time. For example, remote-control apparatus has been proposed for producing and transmitting a remote-control signal in response to a stored timer program at a predetermined time, thereby to effect remote control of audio instruments, video tape recorders, television receivers and the like.

In such remote-control apparatus, a timer may be employed as a remote-control unit and may be inserted into a ROM (read-only memory) cartridge entrance port of a personal computer. Then, if time signals are arranged to have a predetermined relation to one another, audio instruments, a video tape recorder, a television receiver and so on can be controlled by the keyboard of a personal computer in real time. More specifically, a predetermined event signal can be supplied from the keyboard to a CPU (cental processing unit), which then produces the data corresponding to the event signal by reference to a ROM in which a data table is stored, and this data is supplied through an infrared encoder to an LED that functions as an infrared transmitter.

However, although a relatively complex timer program can be written and then stored by such timer apparatus, there is a concern that the timer program will contain an error and that the audio instruments, video tape recorder, television receiver and the like will not be operated as intended.

OBJECTS AND SUMMARY OF THE INVENTION

An object of the invention is to overcome the above-noted drawback of conventional remote-control apparatus and, in particular, to provide remote-control apparatus that makes it possible to determine whether or not the audio apparatus, video tape recorder, television receiver and so on will be properly operated in accordance with a timer program when the timer program is set.

Another object of the invention is to provide remote-control apparatus that can transmit a remote-control signal at a predetermined time in accordance with a stored timer program and that can carry out a simulation when the timer program is written and stored.

In accordance with one aspect of the invention, apparatus is provided for remotely controlling the operation of at least one electronic device, the apparatus comprising: a remote-control unit comprising a read-only memory for storing a data table, means for generating a program to be executed at a predetermined future time, a random-access memory for storing the program, a central processing unit jointly interactive with the read-only memory and the random-access memory, and a transmitter controlled by the central processing unit for producing a remote-control signal based on the data table and the program; a receiver responsive to the remote-control signal for controlling the device in accordance therewith; and simulation means for producing the remote-control signal before the predetermined future time; whereby at least a portion of the program is pre-executed as a test of its validity.

BRIEF DESCRIPTION OF THE DRAWINGS

A better understanding of the objects, features and advantages of the invention can be gained from a consideration of the following detailed description of the preferred embodiment thereof in conjunction with the accompanying drawings, wherein like reference characters designate like elements and parts, and wherein.

DESCRIPTION OF THE PREFERRED EMBODIMENT

Figure 1:
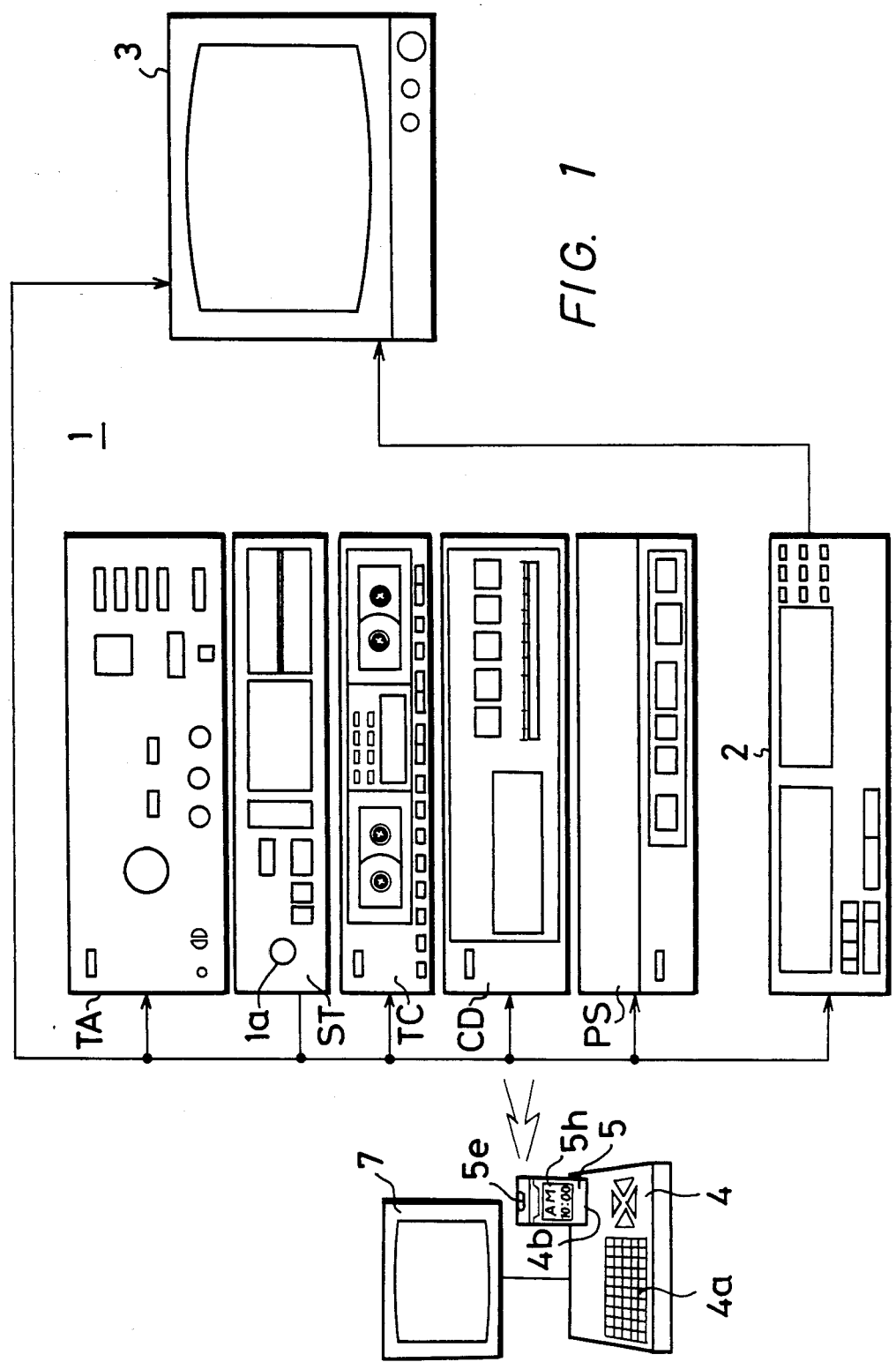
FIG. 1 is a diagram of remote-control apparatus that employs a personal computer and to which the present invention is applicable, and of various electronic devices controlled thereby.

Remote-control apparatus is available for turning on and off the power source of, for example, audio instruments, video tape recorders, and television receivers at a desired time. The remote-control apparatus shown in FIGS. 1 and 2, for example, can produce and transmit a remote-control signal in response to a previously stored timer program at a predetermined future time, thereby to effect remote control of audio instruments 1, a video tape recorder 2, a television receiver 3 and so on at a desired time.

The audio instruments 1 comprise a pre-main amplifier TA, a tuner ST, a cassette tape recorder TC, a compact disc player CD and a record player PS, respectively. An infrared remote-control signal is received by a remote-control signal receiver 1a provided on the tuner ST of the audio instruments 1. In accordance with the received remote-control signal, a predetermined command signal is selectively supplied by the tuner ST to the pre-main amplifier TA, the cassette tape recorder TC, the compact disc player CD and the record player PS of the audio instruments 1; to the video tape recorder 2; or to the television receiver 3. The selected apparatus is thus caused to execute a desired operation. Of course, the video tape recorder 2 and the television receiver 3 can each be provided with a remote-control signal receiver and be controlled thereby.

The remote control signal is for example a digital signal of 12 bits and is assigned to the audio instruments 1, the video tape recorder 2 and the television receiver 3 as indicated for example in the following table 1:

TABLE 1

| CODE No. | CODE | TV 10000 | VTR 01000 | AUDIO SYSTEM 10110 |
|---|---|---|---|---|
| 1 | 0000000 | CH-1 | CH-1 | 1 (preset memory) |

TABLE 1-continued

| CODE No. | CODE | TV 10000 | VTR 01000 | AUDIO SYSTEM 10110 |
|---|---|---|---|---|
| 2 | 1000000 | CH-2 | CH-3 | 2 |
| 3 | 0100000 | CH-3 | CH-3 | 3 |
| 4 | 1100000 | CH-4 | CH-4 | 4 |
| 5 | 0010000 | CH-5 | CH-5 | 5 |
| 6 | 1010000 | CH-6 | CH-6 | 6 |
| 7 | 0110000 | CH-7 | CH-7 | 7 |
| 8 | 1110000 | CH-8 | CH-8 | 8 |
| 9 | 0001000 | CH-9 | CH-9 | 9 |
| 10 | 1001000 | CH-10 | CH-10 | 0 |
| 11 | 0101000 | CH-11 | CH-11 | |
| 12 | 1101000 | CH-12 | CH-12 | |
| 13 | 0011000 | CH-13 | CH-13 | |
| 14 | 1011000 | CH-14 | CH-14 | |
| 15 | 0111000 | CH-15 | CH-15 | MEMORY |
| 16 | 1111000 | CH-16/(CLEAR) | CH-16 | AUTO |
| 17 | 0000100 | CH-HIGH(+) | CH-HIGH(+) | CH-HIGH |
| 18 | 1000100 | CH-LOW(−) | CH-LOW(−) | CH-LOW |
| 19 | 0100100 | VOL-LOUD | | TUNE-UP |
| 20 | 1100100 | VOL-WEAK | | TUNE-DOWN |
| 21 | 0010100 | MUTE | x3 | |
| 22 | 1010100 | POWER ON/OFF | POWER ON/OFF | POWER ON/OFF |
| 23 | 0110100 | NORMAL | EJECT | MEMORY SCAN |
| 24 | 1110100 | MPX MAIN/SUB | MPX MAIN/SUB | |
| 25 | 0001100 | PICTURE-HIGH | STOP | FM |
| 26 | 1001100 | PICTURE-LOW | PAUSE | LR |
| 27 | 0101100 | COLOR-VIVID | PB | MR (AM) |
| 28 | 1101100 | COLOR-PALE | REWIND | SW 1 |
| 29 | 0011100 | CH-LOCK | FF | SW 2 |
| . | . | . | . | . |
| . | . | . | . | . |
| . | . | . | . | . |

In table 1, the reference TV designates the television receiver 3, VTR the video tape recorder 2, and AUDIO SYSTEM the audio instruments 1.

A personal computer 4 (FIG. 1) is provided with a keyboard 4a, a ROM cartridge entrance port 4b into which a software cartridge for computer games and so on is inserted, and other components customary on a general-purpose personal computer. Timer apparatus 5 performs a timing function and also serves as a remote-control unit for producing an infrared remote-control signal. The timer apparatus 5 is formed so that it can be connected to the ROM cartridge entrance port 4b.

Figure 2:
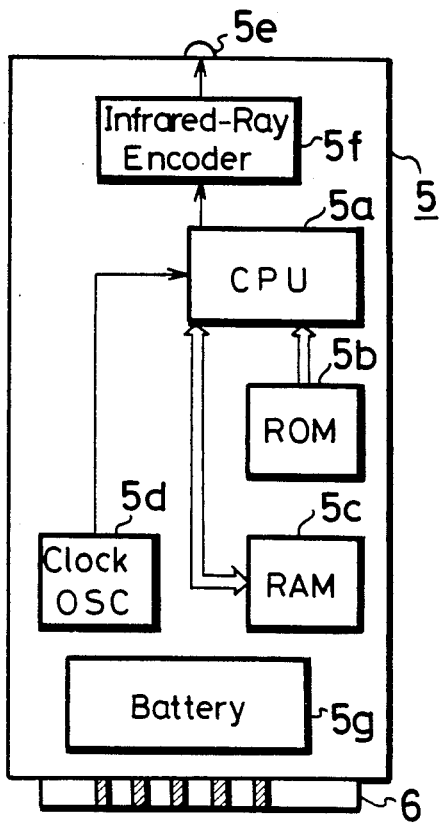
FIG. 2 is a circuit block diagram of remote-control apparatus in which a ROM cartridge of a personal computer is provided with an infrared encoder.

As FIG. 2 shows, the timer apparatus 5 serving as the remote-control unit comprises a CPU (central processing unit) 5a for processing a data signal, a ROM (read-only memory) 5b in which the data shown in table 1 is stored so as to supply the data to the CPU 5a, a RAM (random-access memory) 5c that stores a predetermined program and supplies it to the CPU 5a at a predetermined time, a clock generating circuit or oscillator 5d that performs a clock function and produces a predetermined time signal, an LED (light-emitting diode) 5e, an infrared-ray encoder 5f that converts the output signal of the CPU 5a to a drive signal that drives the LED 5e to emit an infrared ray corresponding to the output signal of the CPU 5a, and a power source or battery 5g. The timer apparatus 5 is provided with a terminal portion 6 by which, when the timer apparatus 5 is inserted into the ROM cartridge entrance port 4b of the personal computer 4, a predetermined electrical connection is established therebetween. The timer apparatus 5 is moreover provided with a display 5h (FIG. 1) that displays the time in response to the time signal produced by the clock generating circuit 5d (FIG. 2).

A monitor receiver 7 (FIG. 1) may be provided for the personal computer 4. Alternatively, the television receiver 3 can be used as the monitor receiver 7.

Figure 3:
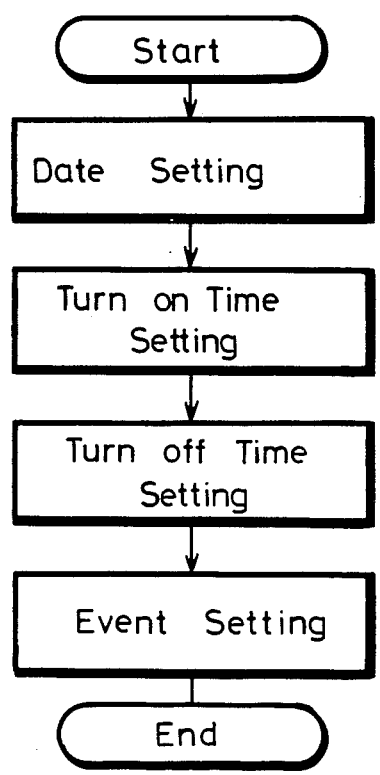
FIGS. 3 and 4 are flow charts respectively showing the steps involved in setting and transmitting a remote-control signal.

When a desired timer program signal is to be written in the RAM 5c of the timer apparatus 5, the terminal portion 6 of the timer apparatus 5 is first inserted into the ROM cartridge entrance port 4b of the personal computer 4, and predetermined terminals thereof are electrically and automatically connected to one another. The CPU 5a, the RAM 5c and so on of the timer apparatus 5 are then controlled by using the keyboard 4a of the personal computer 4. The writing of the timer program in the RAM 5c is carried out, as FIG. 3 shows, in the sequence "data setting", "turn ON time setting", "turn OFF time setting" and "event setting". An example of the timer program is given in the following table:

TABLE 2

| August 31 | 10:00 | Reproducing cassette tape recorder TC |
|---|---|---|
| | 10:30 | ALL OFF |
| | 11:00 | Recording channel 10 by video tape recorder 2 |
| | 12:00 | ALL OFF |
| . | . | . |
| . | . | . |
| . | . | . |

The timer program is written into the RAM 5c through the CPU 5a. When the writing of the program is completed, the timer apparatus 5 is removed from the personal computer 4 and then placed at any convenient location.

Figure 4:
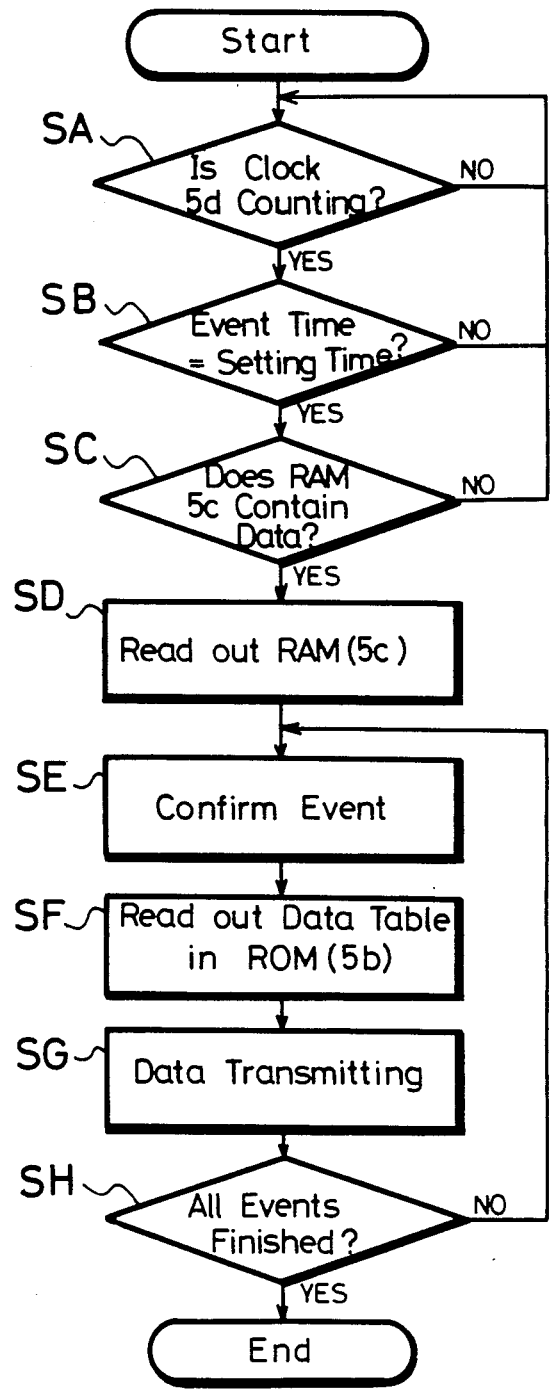

The flow chart of FIG. 4 shows the operation of the timer apparatus 5. As FIG. 4 shows, in the timer apparatus 5, the program determines at step SA whether or not the oscillator 5d is counting. If the oscillator 5d is found not to be counting, the program loops back. If the oscillator 5d is determined to be counting when checked at step SA, then, whether or not the next event time has arrived at the setting time is judged by the timer program at step SB. This is done with the aid of the time signal from the clock circuit 5d. Until the set time arrives as determined at step SB, the program loops back.

When the event time arrives as determined at step SB, it is determined at step SC whether the RAM 5c contains data. If it contains no data, the program loops back. If the RAM SC contains data when checked at step SC, then the content of the event is read out from the RAM 5c at step SD and the event is executed. The content of the event is confirmed at step SE and the data code corresponding to this event is produced at step SF with reference to the data table stored in the ROM 5b. The data is then supplied through the infrared encoder 5f to the LED 5e, and the infrared ray corresponding thereto is transmitted by the LED 5e at step SG. By this infrared ray, the audio instruments 1, the video tape recorder 2, the television receiver 3 and so on are controlled to execute the predetermined operations. Then, whether or not all of the events thus set have been executed is confirmed at step SH. If all of the events have not been executed when checked at step SH, the program loops back to step SE. When all of the events thus set have been executed, one remote-control operation is finished. In accordance with the timer program stored in the RAM 5c, the operation described above is sequentially carried out repeatedly, and a series of remote-control operations in accordance with a predetermined setting time are thus carried out.

In the example described above, while the timer apparatus 5 serving as the remote-control unit is still inserted into the ROM cartridge entrance port 4b of the personal computer 4, it is possible that, if the time signals are arranged to have a predetermined relation, the audio instruments 1, the video tape recorder 2, the television receiver 3 and so on can be controlled by the keyboard 4a of the personal computer 4 in real time. More specifically, a predetermined event signal can be supplied from the keyboard 4a to the CPU 5a, which then produces the data corresponding to the event signal with reference to the ROM 5b in which the data table is stored, and this data is supplied through the infrared encoder 5f to the LED 5e.

However, although a relatively complex timer program can be written and then stored by the apparatus, there is a concern that the program will contain an error and that the audio instruments 1, the video tape recorder 2, the television receiver 3 and the like will not be operated as intended.

Figure 5:
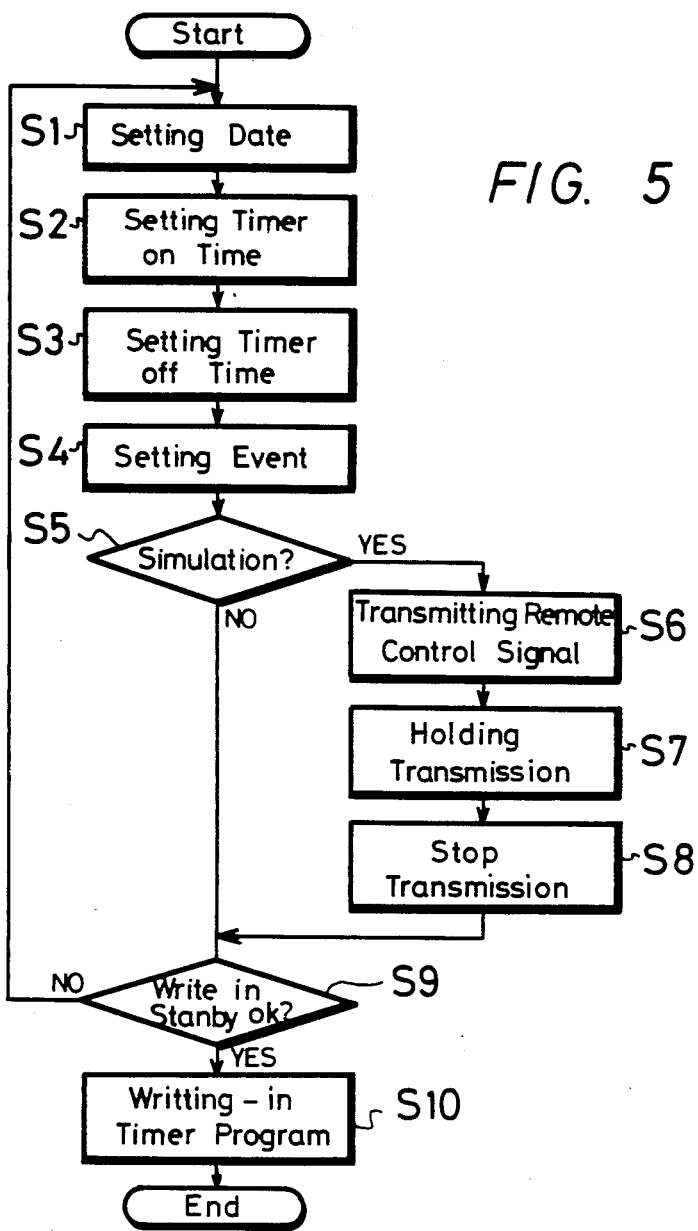
FIG. 5 is a flow chart showing the simulation mode of a timer program of the present invention.
Figure 6:
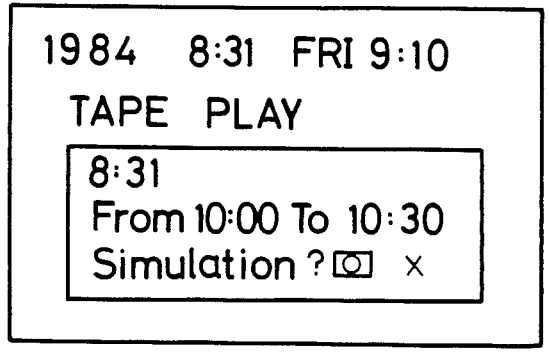
FIG. 6 is a diagram of a display portion of the remote-control apparatus.

The present invention removes this concern. FIGS. 5 and 6 illustrate a preferred embodiment of a simulation mode and an associated display in accordance with the invention. The hardware employed in accordance with the invention may have any of a variety of configurations and may include the timer apparatus serving as the infrared remote-control unit shown in FIGS. 1 and 2. The writing and storing of a predetermined timer program is carried out in accordance with a procedure shown in the flow chart of FIG. 5.

In accordance with this embodiment of the invention, when a predetermined timer program is stored in the RAM 5c (FIG. 2) of the timer apparatus 5 serving as the remote-control unit, the terminal portion 6 of the timer apparatus 5 serving as the remote-control unit is inserted into the ROM cartridge entrance port 4b (FIG. 1) of the personal computer 4, and predetermined terminals thereof are electrically connected to one another. Then the CPU 5a (FIG. 2), the RAM 5c and so on of the timer apparatus 5 serving as the remote-control unit are controlled by the use of the keyboard 4a (FIG. 1) of the personal computer 4.

As the flow chart of FIG. 5 shows, the timer program is set and then stored in the sequence "set data", "set timer-ON time", "set timer-OFF time", and "set event", at steps S1, S2, S3 and S4, respectively. This is done by the use of the keyboard 4a of the personal computer 4. Then, at step S5, it is determined whether or not a simulation is to be carried out. When the timer program is such that, for example, a tape is to be reproduced by the cassette tape recorder TC during the period from 10:00 a.m. to 10:30 a.m., the timer-ON time is set at 10:00 a.m., the timer-OFF time is set at 10:30 a.m., and the event is set so that the cassette tape recorder TC is placed in the playback mode., As FIG. 6 shows, the thus set timer program is displayed on a video screen 7a of the monitor receiver 7 of the personal computer 4. When a simulation is to be carried out, a cursor (not shown) controlled by the keyboard 4a (FIG. 1) is placed in the position, "O" (FIG. 6) adjacent to "simulation?" on the display screen 7a of the monitor receiver 7, and then an execution key on the keyboard 4a is depressed. This causes the event signal to be produced, and a remote-control signal corresponding to the event signal is emitted at step S6 (FIG. 5) by the LED 5e (FIG. 2) under the control of the CPU 5a and the infrared encoder 5f.

The cassette tape recorder TC is (in the example) then placed in the playback mode at step S7 (FIG. 5) for, say, 15 seconds, so that it can be determined whether or not the program as written causes the event to be properly executed. An all OFF signal is then produced at step S8. If the operation by the remote-control unit at that time is satisfactory as determined at step S9, the timer program is recorded in the RAM 5c at step S10. If on the other hand the operation by the remote-control unit is not satisfactory as determined at step S9, the timer program loops back to step S1 so that it can be rewritten. If the user of the apparatus elects at step S5 not to carry out a simulation and approves the program at step S9 the timer program as originally written is stored in the RAM 5c directly.

The circuit construction and operation of this embodiment of the invention is otherwise similar to that described hereinbefore in connection with FIGS. 1 to 4.

According to the present invention as set forth above, when the timer program is written and then stored in the RAM 5c, a simulation can be carried out so that it is possible to confirm whether or not the remote-control operation as programmed by the set timer program will be properly executed. This removes the concern of the user regarding a possible mistake in the program.

Many modifications of the preferred embodiment of the invention disclosed herein will readily occur to those skilled in the art upon consideration of this disclosure. For example, the manner of commanding a simulation, the information about the program displayed on the screen 7a and other details may be varied within wide limits. Accordingly, the invention is limited only by the appended claims.

I claim:

1. Apparatus for remotely controlling the operation of at least one electronic device; said apparatus comprising:

a remote-control unit removeably attachable to a personal computer having a keyboard, said unit including a read-only memory for storing a data table, means for generating a program of events to be executed at predetermined future times, a random-access memory for storing said program, a central processing unit jointly interactive with said read-only memory and said random-access memory, and a transmitter controlled by said central processing unit for producing remote-control signals corresponding to said events and being based upon said data table and said program;

a receiver responsive to said remote-control signals for controlling said device in accordance therewith; and simulation means for producing said remote-control signals and causing the respective events to occur before said predetermined future times in response to operations of said keyboard of the personal computer;

whereby at least a portion of said program is pre-executed as a test of its validity.

2. Apparatus according to claim 1; wherein said remote-control unit comprises a cartridge and said transmitter is an infrared transmitter attached to said cartridge.

3. Apparatus according to claim 1; wherein said program includes digital code signals that represent data, timer-ON time, and timer-OFF time, and specify said electronic device.

4. Apparatus according to claim 1; wherein said simulation means produces said remote-control signals in response to execution orders given by a user of the apparatus and entered through said keyboard.

5. Apparatus according to claim 1; wherein said transmitter comprises an infrared encoder and a light-emitting diode connected to said encoder.

6. Apparatus according to claim 1 for remotely controlling the operation of at least a tuner, a power amplifier and tape recording apparatus; wherein said receiver is connected to said tuner and adapted to enable said tuner to receive a broadcast signal in response to said program and to supply said broadcast signal to said tape recording apparatus for recording.

* * * * *